Aug. 22, 1961  K. PORLAND ET AL  2,997,241
THERMOSTATIC REGULATING ELEMENT FOR A CONTROL
DEVICE, PREFERABLY A VALVE BODY
Filed Feb. 6, 1959
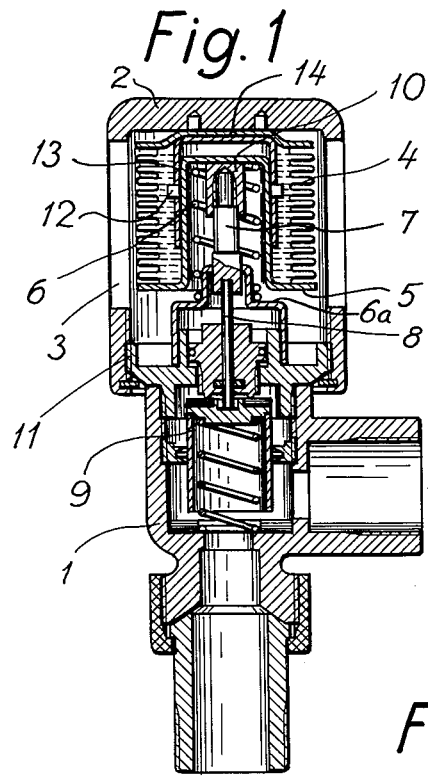
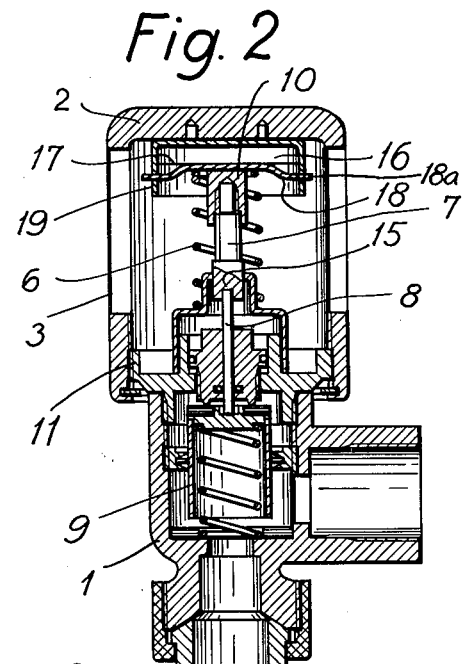
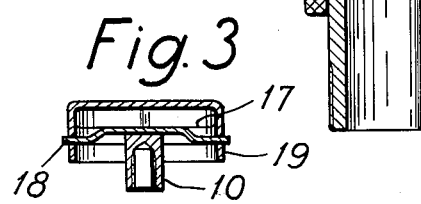
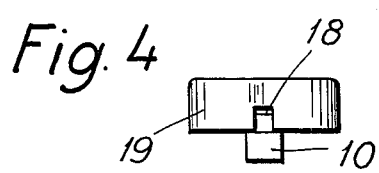
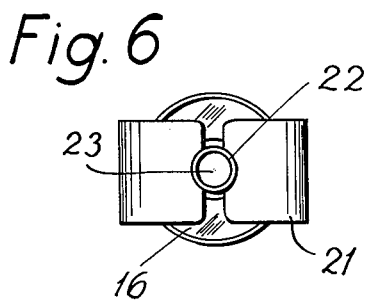
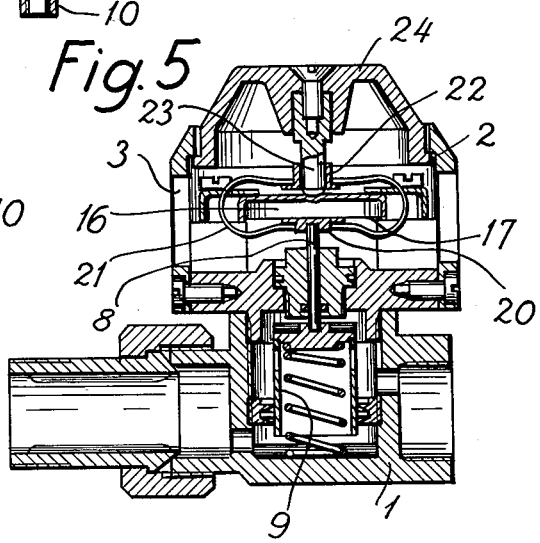

2,997,241
Patented Aug. 22, 1961

2,997,241
THERMOSTATIC REGULATING ELEMENT FOR A CONTROL DEVICE, PREFERABLY A VALVE BODY
Kjeld Porland and Carl Sorensen, Elsmark, Nordborg, Als, Denmark, assignors to Danfoss ved ingenior Mads Clausen, Elsmark, Nordborg, Denmark
Filed Feb. 6, 1959, Ser. No. 791,578
Claims priority, application Denmark Feb. 6, 1958
4 Claims. (Cl. 236—95)

This invention relates to a thermostatic regulating element for a spring-activated control device, preferably a valve body, and consisting of an exchangeable casing or housing in which a steam-filled and expansible feeler with a movable wall is retained which is in connection with an axially displaceable stem acting on the control device, the movable wall for varying the steam pressure necessary for displacing the stem being subjected to spring action directed against the wall.

It is the object of the invention to provide a regulating element of the aforesaid kind without protruding feeler and which is easy to adjust and to replace and in which the feeler is not subjected to torsional stresses when the operating control of the regulating element is turned in order to vary the working pressure in the feeler and in which tension of the spring involves no displacement of the valve body towards its closing position. This is accomplished in accordance with the invention by means of a regulating element the essential feature of which is that such end of the displaceable stem as faces the feeler is guided in a sleeve attached to the movable end bottom and that for adjusting the tension of the spring acting on the movable end bottom of the feeler and consequently of the working pressure necessary for displacing the stem there are provided means which are movable in relation to each other longitudinally of the stem and serve to transmit—without producing any torsional stresses on the feeler—a variation, produced by turning an operating handle, in the difference between the pressure forces exerted by the spring action on the fixed and the movable end bottoms of the feeler.

An essential feature of an embodiment of a regulating element in accordance with the invention is that the screwthreaded casing of the regulating element is connected with the casing of the control device, preferably a valve casing for regulating the tension of the spring acting on the movable wall of the feeler. The other end of the said spring steps on a fixed contact surface of the valve casing, the stem being by means of a guide provided in the valve casing prevented from turning and is connected with a sleeve on the movable wall of the feeler by means of a screwthread having the same pitch as the screwthread of the regulating element. Furthermore, members engaging each other and serving to transmit the torsional force from the fixed to the movable bottom of the feeler are provided in fixed connection with the casing of the regulating element and the sleeve, respectively, into which sleeve the stem is screwed. The pressure inside the feeler and consequently the temperatures for opening and closing the valve are readily adjusted by turning the casing of the element by hand, and since the two screwthreads are of identical pitch, the active length of the valve stem varies exactly with the variations in the distance of the movable wall from the valve seat, that is, the length of the full travel of the valve body is retained unaltered. The members for transmitting the torsional movement increase the lifetime of the feeler, since the feeler in the long run is only resistant to tension and compression, but not to torsion.

The feeler may in accordance with the invention be designed as a bellows, whose stationary, substantially flat end wall is attached to the casing of the regulating element and whose movable end wall is cupped and constitutes a contact surface of the spring, the members for transmitting the torsional force consisting of driving pins projecting downward from the fixed end wall and each located between two webs projecting from the sides of the cupped end bottom. In accordance with the invention the feeler may also be a membrane box with a rigid end bottom which is connected with the casing of the regulating element, its opposite end bottom being designed as a resilient membrane constituting a contact surface for the spring, the members for transmitting the torsional force consisting of extended, slotted sections of the side wall of the membrane box into whose slots driving pins in permanent connection with the sleeve of the movable end bottom project. This embodiment means an economy in material and permits of lower building height of the element.

A design that can be manufactured with substantial economy of material and is of low height is, in particular, obtained by a regulating valve according to the invention the essential feature of which is that the feeler is a membrane box attached in the regulating casing and having a resilient end bottom or membrane. Attached to the sleeve mounted on the said membrane is one end of a pair of curved laminated springs which surround the membrane box, their other end being attached to a sleeve with inside screwthread. In order to tension the spring the said sleeve may move on a screwthreaded stem the other end of which rests on the fixed end bottom of the box while its other end carries an operating handle.

The regulating element is in particular intended to be mounted on a radiator valve with relieved valve body, by which the valve stem may be made of thin material having low thermal conductivity, for example, stainless steel, as a result of which the amount of heat that can be transmitted from the valve body is negligible and does not influence the function of the regulating element.

The invention will now be explained in detail with reference to the drawing, in which FIGURE 1 is a section of an angle valve with corresponding regulating element according to the invention with a feeler designed as a bellows.

FIGURE 2 is the same, but with the feeler designed as a membrane box,

FIGURE 3 is a membrane box in the valve disclosed in FIGURE 2, viewed in section, FIGURE 4 is a sideview of that disclosed in FIGURE 3, FIGURE 5 is a straightway valve with corresponding regulating element with a membrane box on which laminated springs are acting, and FIGURE 6 shows the feeler disclosed in FIGURE 5, viewed from above.

On a valve casing 1 there is mounted a regulating element with a cylindrical housing 2 the side walls of which are provided with flow openings 3 for the air in the room so that the said air has free access to a feeler which in the element shown in FIGURE 1 is designed as a bellows 4 attached to the housing 2 and having a movable cupped end bottom 5 whose central surface, which is passed into the bellows 4, is subjected to the pressure exerted by a spring 6. The other end of the spring 6 rests against a fixed surface defined by a shoulder 6a of the valve casing and is wound around a bar or spindle 7 the lower end of which is connected with a thin valve stem 8 carrying a cylindrical pressure-relieved valve body 9. The upper end of the spindle 7 is screwed into a sleeve or socket 10 on the end bottom 5 and is capable of transmitting the movements of the end bottom to the valve body 9 through the stem 8, but the spindle 7 is prevented from turning about its axis because it is formed with a part 15 of polygonal, e.g. square, cross-section which slides in a corresponding polygonal, e.g. square, guide that is in fixed connection with the valve casing.

The screwthread by means of which the bar or spindle 7 is screwed into the sleeve or socket 10 is of the same pitch as a screwthread 11 by means of which the housing of the element is screwed onto the valve casing. The tension of the spring 6 and consequently the steam pressure in the feeler necessary for moving the valve stem is regulated by turning the housing 2 by hand, the housing 2 thus serving as an adjustment handle. The driving torque is transmitted from the end wall 14 of the feeler, which end wall is attached to the housing 2, to the end bottom 5 through driving pins 12 located between protruding webs 13 on the end bottom, whereby the spindle 7 is moved up or down in the sleeve, and the effective length of the stem is varied in conformity with the displacement of the valve housing and the feeler in relation to each other. The valve body does therefore not change its position during the regulation and may at any adjustment travel freely between fully open and fully closed positions, the spindle being longitudinally displaced upon rotation of the casing or housing 2 without transmission of torque to the spindle.

In the regulating element disclosed in FIGURE 2 the feeler is designed as a membrane box 16 with a movable end wall or membrane 17 on which the sleeve 10 with screw thread for the spindle 7 is mounted. The adjustment is effected as described with reference to FIGURE 1, and the driving torque is transmitted from the housing 2 through the extended and slotted side walls or extensions 19 of the membrane box to driving pins 18 which are attached to the sleeve or socket 10 and have extensions 18a project through the slots in the side walls 19 (see FIGURES 3 and 4).

In the regulating element disclosed in FIGURE 5 the feeler is likewise a membrane box with a movable end bottom or membrane 17 on which a sleeve or socket 20 guiding the valve stem 8 is mounted. On the socket 20 are mounted a pair of curved laminated springs 21 (FIGURE 6), which are bent over the membrane box 16, their other end being attached to a sleeve 22 having an inside screwthread and being capable of moving along a likewise screwthreaded stem 23 when the latter is turned by means of the operating handle 24. Hereby the laminated springs 21 will comprises the membrane box 16 more or less so that the amount of steam pressure necessary for closing the valve and consequently the temperature in the room may be varied.

What we claim and desire to secure by Letters Patent is:

1. A thermostatic control unit for a spring-activated valve body contained in a valve casing, comprising, in combination, a rotatable housing threadedly engaged with said valve casing for relative rotation thereto, a vapor-filled extensible feeler body secured to said housing and having a movable wall provided with a screw-threaded socket secured thereto, a longitudinally-displaceable spindle having one end threaded-engaged in said socket and positioned to transmit its longitudinal movements to said valve body, and spring means biasing said movable wall, said spring means resiliently acting between said wall and a fixed surface of said valve casing, and means for preventing rotation of said spindle, the threads of said socket and spindle having the same pitch as the threads of the threaded connection between said housing and said casing, whereby said spindle is longitudinally-displaced upon rotation of said housing without transmission of torque to said spindle.

2. A thermostatic control unit as defined in claim 1 wherein said feeler body is a bellows having one end wall secured to said rotatable housing and having its opposite movable end wall forming a support surface for said spring means and means interconnecting said first-named end wall with said movable end wall, whereby both of said walls moves simultaneously in the same direction upon rotation of said housing.

3. A thermostatic control unit as defined in claim 1, wherein said feeler body has an end wall secured to said housing and said end wall is formed with extensions and wherein said movable wall of said feeler body is elastic and is connected by extensions engaging with the extensions of said first-named wall.

4. A thermostatic control unit as defined in claim 1, wherein a portion of said spindle has a polygonal cross section and said means for preventing rotation of said spindle comprises a fixed socket slidably receiving said spindle portion.

References Cited in the file of this patent
UNITED STATES PATENTS

| | | |
|---|---|---|
| 1,662,289 | Whitehead | Mar. 13, 1928 |
| 1,834,680 | Chartrand | Dec. 1, 1931 |
| 2,673,688 | Busser | Mar. 30, 1954 |